United States Patent
Lin et al.

(10) Patent No.: US 6,619,683 B1
(45) Date of Patent: Sep. 16, 2003

(54) FRONT-FORK TELESCOPING BICYCLE HANDLEBAR ASSEMBLY

(76) Inventors: Jung-Te Lin, No. 14, Ta-Hua First Road, Keelung (TW); Ruey Shong Nelson Lin, 80 S. Ranchos Legante Dr., Gilbert, AZ (US) 85296

( * ) Notice: Subject to any disclaimer, the term of this patent is extended or adjusted under 35 U.S.C. 154(b) by 0 days.

(21) Appl. No.: 10/117,531

(22) Filed: Apr. 4, 2002

(51) Int. Cl.[7] ............................................... B62K 21/00
(52) U.S. Cl. ........................ 280/270; 280/279; 280/263
(58) Field of Search .................. 280/274, 279, 280/263, 270; 74/551.1, 551.3, 551.4

(56) References Cited

U.S. PATENT DOCUMENTS 5,351,979 A * 10/1994 Langen ........................ 280/254
5,775,708 A * 7/1998 Heath ......................... 280/234

* cited by examiner

Primary Examiner—Lesley D. Morris
Assistant Examiner—L. Lum
(74) Attorney, Agent, or Firm—Schmeiser, Olsen & Watts

(57) ABSTRACT

A telescoping bicycle handlebar assembly is disclosed wherein a crossbar adapted to provide support for a rider's hands during a bicycle ride is attached to a downbar extending substantially perpendicularly therefrom. A hollow tube adjacent to the front wheel of the bicycle and displaced from the bicycle's centerline is adapted to receive various lengths of the downbar depending on the height at which the handlebars are to be placed. A securing device is attached to the hollow tube and adapted to selectively secure the downbar in place inside the tube.

8 Claims, 4 Drawing Sheets

US 6,619,683 B1

FRONT-FORK TELESCOPING BICYCLE HANDLEBAR ASSEMBLY

BACKGROUND OF THE INVENTION

1. Technical Field

This invention generally relates to a bicycle handlebar assembly, and more specifically relates to a telescoping bicycle handlebar.

2. Background Art

The handlebar assembly of a bicycle conventionally includes gripping regions and a stem adapted for insertion into the bicycle's head tube. The head tube is centered on the bicycle's longitudinal centerline with the gripping regions symmetrically arranged on either side. Bicycle handlebars have long been made adjustable in height so as to accommodate various requirements of the rider or the situation in which the bicycle is placed. Riders with long arms, for example, may be more comfortable when handlebars are positioned farther from the ground than would be the case for riders with shorter arms. A bicycle being ridden over rough terrain may require a different handlebar height than a bicycle ridden over smooth surfaces. The handlebars of a bicycle in storage may be lowered significantly from their position when the bicycle is ready for use. Conventionally, bicycle handlebars are adjusted by releasing a securing force maintaining the position of the handlebars, moving the handlebar stem to a new position within the head tube, and reapplying the securing force.

The degree to which conventional bicycle handlebars may be adjusted is limited by the presence of the front wheel underneath the head tube. There may arise situations in which it is necessary or desirable to adjust the height of a handlebar assembly to a greater degree than that allowed by the conventional handlebar configuration. One such situation arises in conjunction with a folding bicycle. Folding bicycles are bicycles provided with one or more joints allowing them to be folded to a compact size for storage or transport. To achieve the compact folded dimensions desired, the frame of a folding bicycle may be smaller than the frame of a non-folding bike, a feature that is compensated for by elongating the handlebar stem. (See FIG. 1.) As discussed above, the position of the front wheel prevents the elongated stem from being lowered to the necessary degree. This problem is overcome on conventional folding bicycles by placing a joint in the handlebar assembly such that the handlebars may be folded over against the front wheel. (See FIG. 2). This approach is flawed in several respects. For example, the joint mechanism that allows the handlebars to be folded adds weight, expense, and instability to the bicycle. Because it is difficult to eliminate all of the play in the joint the handlebars may shake or rock, making a rider feel unsteady or off balance. Furthermore, the folding procedure is unnecessarily cumbersome, and space that could be used more beneficially is dedicated to housing the folding mechanism and related components.

SUMMARY OF THE INVENTION

Therefore, there exists a need for an adjustable handlebar assembly that overcomes the limitations of the prior art and allows a compact handlebar profile while adding no unnecessary expense, weight, or instability to the bicycle. The present invention fills that need by providing a telescoping bicycle handlebar assembly wherein a crossbar adapted to provide support for a rider's hands during a bicycle ride is attached at a first end to a downbar extending substantially perpendicularly therefrom. A hollow tube adjacent to the front wheel of the bicycle and displaced from the bicycle's centerline is adapted to receive various lengths of the downbar depending on the height at which the handlebars are to be placed. A securing device is attached to the hollow tube and adapted to selectively secure the downbar in place inside the tube.

The described basic configuration of the present invention allows the handlebar assembly to be quickly and easily adjusted to a variety of positions without introducing unsteadiness or instability to the handlebars while contributing a minimum of expense and weight. A further advantage of the present invention is that it frees the area directly over the front wheel to be used as storage space if desired. Items stored in this area will be well balanced and easy to manage because they will be located substantially on the longitudinal centerline of the bicycle.

BRIEF DESCRIPTION OF THE DRAWINGS

The foregoing and other features and advantages of the invention will be apparent from the following more particular description of specific embodiments of the invention, as illustrated in the accompanying drawings, wherein.

It should be noted that the figures are not necessarily drawn to scale, and that elements having similar functions may in some cases be labeled using the same reference numerals.

DETAILED DESCRIPTION OF EMBODIMENTS OF THE INVENTION

The present invention provides a telescoping bicycle handlebar assembly wherein a crossbar adapted to provide support for a rider's hands during a bicycle ride is attached to a downbar extending substantially perpendicularly therefrom. A hollow tube adjacent to the front wheel of the bicycle and displaced from the bicycle's centerline is adapted to receive various lengths of the downbar depending on the height at which the handlebars are to be placed. A securing device is attached to the hollow tube and adapted to selectively secure the downbar in place inside the tube.

Figure 1:
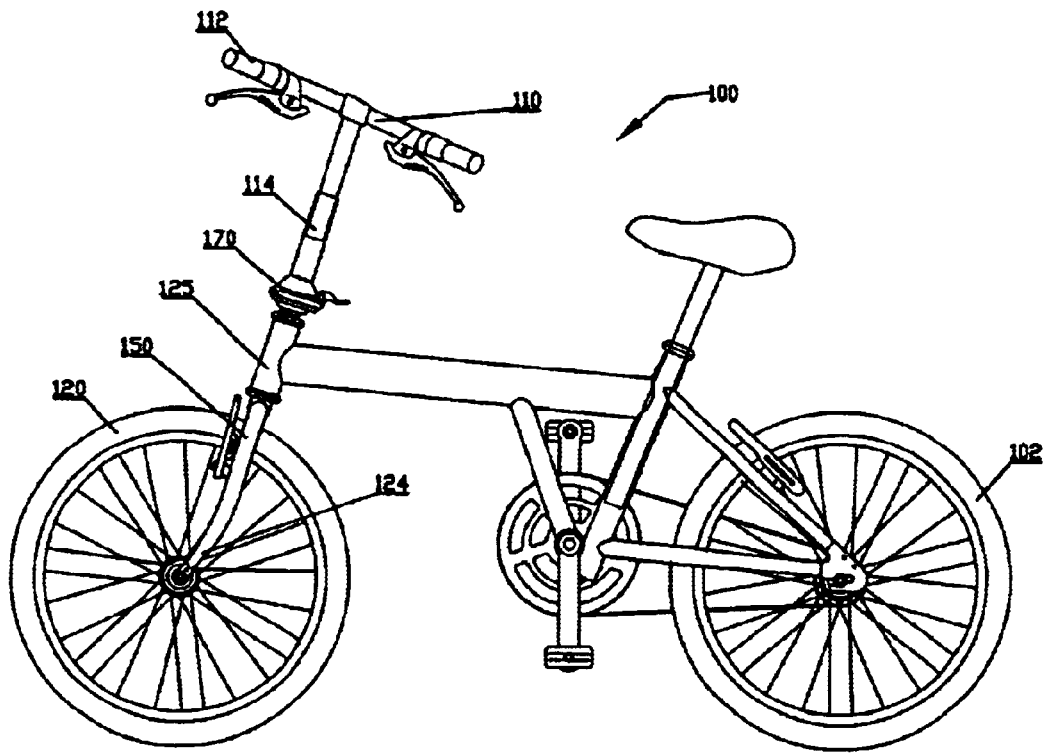
FIG. 1 is a side view of an existing bicycle wherein a handlebar assembly includes a folding mechanism.
Figure 2:
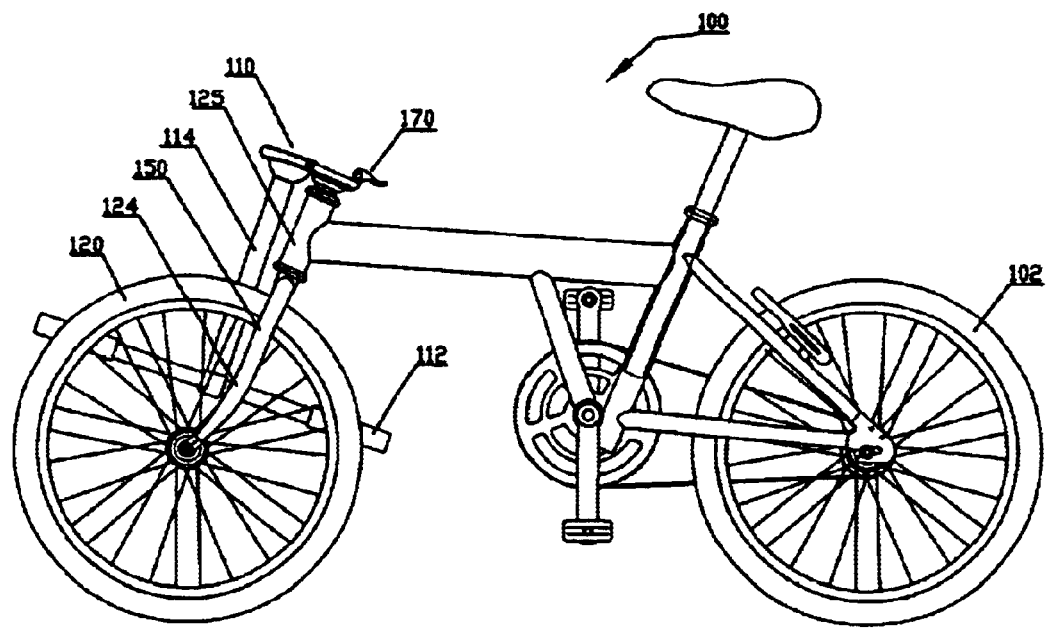
FIG. 2 is a side view of the bicycle of FIG. 1 with the handlebar folded.

Referring now to the figures, and in particular to FIGS. 1 and 2, a conventional bicycle 100 includes a rear wheel 102, a front wheel 120, a handlebar assembly 110, and a front fork 124. Handlebar assembly 110 includes a crossbar 112 and a downbar 114. Front fork 124 includes a first fork arm 150. A head tube 125 is located at the base of downbar 114. In FIG. 1, handlebar assembly 110 is shown in the upright, operating position, while in FIG. 2 it is shown in a collapsed position suitable for storage or transport. A folding mechanism 170 is included in handlebar assembly 110 of conventional bicycle 100 to accomplish the handlebar folding process.

Figure 3:
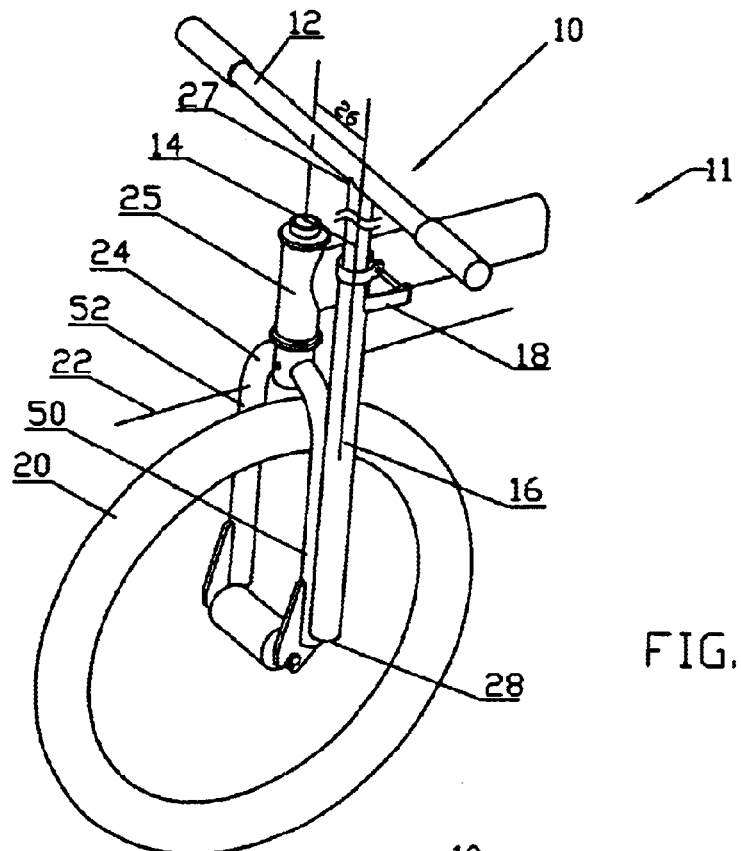
FIG. 3 is a perspective view of a handlebar assembly configured according to an embodiment of the present invention.
Figure 4:
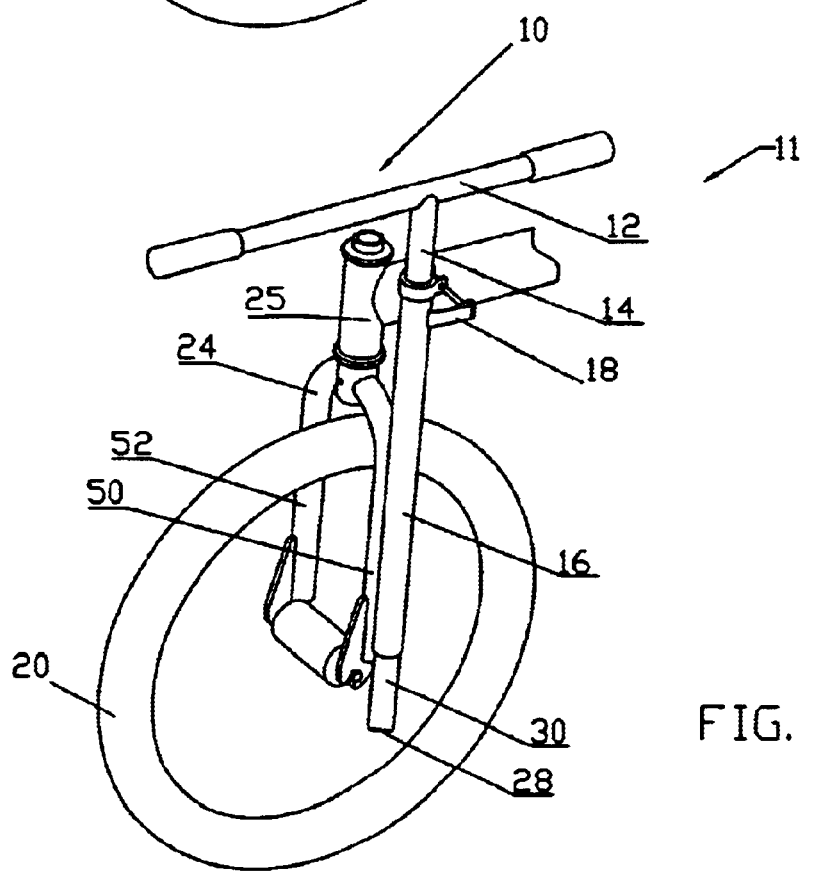
FIG. 4 is a perspective view of the handlebar assembly of FIG. 3 with the handlebar in a collapsed position.

Referring now to FIGS. 3 and 4, a handlebar assembly 10 of a bicycle 11 (only the front portion of which is shown) comprises a crossbar 12, a downbar 14 attached at an attached end 27 to crossbar 12, a hollow tube 16, and a securing device 18. It should be noted that crossbar 12 may take any of several configurations. FIGS. 3 and 4 depict a straight bar substantially perpendicular to downbar 14. Alternatively, crossbar 12 could include straight and curved portions, limited only by the requirement that crossbar 12 be connected at some point to downbar 14. For example, crossbar 12 could include portions that curve back toward a bicycle rider and offer support for a rider's hands when in an aerodynamic, forward-leaning position. As another example, crossbar 12 could extend up and back from downbar 14 in a sweeping "V" configuration like that conventionally used on some motorcycle handlebars. Other configurations are also possible, and the term "crossbar" in this description of the invention encompasses all possible configurations subject only to the downbar connection limitation mentioned above. A front wheel 20 defines a longitudinal centerline 22 of bicycle 11 about which crossbar 12 is balanced. Longitudinal centerline 22 is a centrally located line drawn from front wheel 20 to the back wheel, not shown, of bicycle 11. Front wheel 20 is straddled by a front fork 24, which has a first fork arm 50 and a second fork arm 52. A head tube 25 is centered on centerline 22 and sits above front wheel 20. Head tube 25 may in some embodiments of the present invention comprise a part of front fork 24, and hollow tube 16 may be attached to front fork 24. Among other possibly suitable attachment sites, hollow tube 16 may be attached to either first fork arm 50 or second fork arm 52 at a location distal to centerline 22. A person of ordinary skill in the art will recognize that various methods of attachment may be used. Welding is one such attachment method.

Hollow tube 16 is displaced from centerline 22 by a displacement distance 26 which is greater than half the width of front wheel 20. This allows hollow tube 16 to clear front wheel 20 and, because front wheel 20 does not interfere, permits downbar 14 to be lowered to a greater extent than would be possible if the height adjustment were to take place along an axis centered on centerline 22. In order to maintain customary balance and feel for a rider of bicycle 11, crossbar 12 may be centered, as is conventional, on centerline 22 so that substantially equal lengths of crossbar 12 lie on either side of centerline 22. As a consequence of this, the junction of crossbar 12 and downbar 14 will not be centered on crossbar 12 but will instead be displaced from the center of crossbar 12 by an amount equal to displacement distance 26. Note that the area above head tube 25 is empty due to the displacement of downbar 14 through displacement distance 26. This empty space, centered on centerline 22, is ideal for use as storage space because any item placed there will be both balanced and out of the way of a rider's legs and arms. This space may be taken advantage of in a variety of ways. For example, head tube 25 may be used as a mounting location for a basket, not shown. Alternatively, a bag, also not shown, may be hung from crossbar 12 into the space above head tube 25.

Aluminum may be used as a suitable material for crossbar 12 and downbar 14, and a suitable material for hollow tube 16 is chrome molybdenum steel, although other materials may also be used for either or both components. Hollow tube 16 may be constructed so as to admit substantially the entire length of downbar 14, in which case hollow tube 16 may include an endcap, not shown, capping a first end 28. In another embodiment, hollow tube 16 may be open ended such that a free end 30 of downbar 14 distal to crossbar 12 is free to protrude beyond first end 28 of hollow tube 16 as shown in FIG. 4.

In use, handlebar assembly 10 may be adjusted by releasing a securing force, such as may be provided by securing device 18, from downbar 14, sliding downbar 14 in hollow tube 16 in a telescoping fashion until crossbar 12 is at a desired height and orientation, and restoring the securing force to downbar 14. The term "telescoping" simply means that downbar 14 may slide inward or outward as desired with respect to hollow tube 16. The inventors have found that the time required for the adjustment process may be reduced by up to one third over that necessary to operate the folding mechanism depicted in FIG. 1. Note that crossbar 12 may be oriented in any configuration with respect to centerline 22. FIG. 3 depicts an orientation for crossbar 12 that is substantially perpendicular to centerline 22 and FIG. 4 depicts a substantially parallel configuration.

Figure 5:
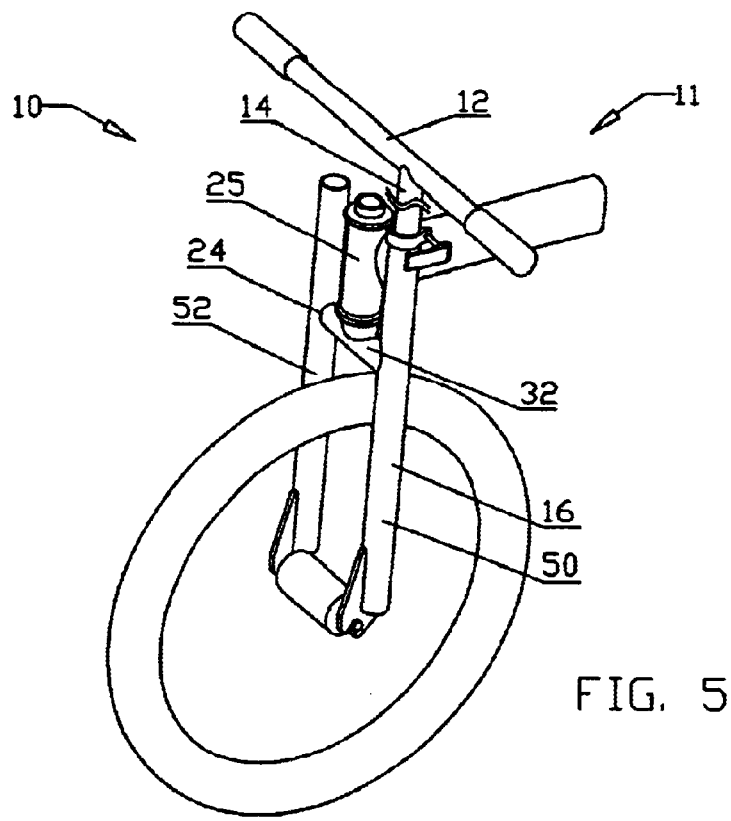
FIG. 5 is a perspective view of a handlebar assembly configured according to another embodiment of the present invention.

Referring now to FIG. 5, a handlebar assembly 10 is configured according to another embodiment of the present invention wherein front fork 24 has been modified with the addition of a straight tube 32 between first fork arm 50 and second fork arm 52. Straight tube 32, in one embodiment, is substantially perpendicular to first and second fork arms 50 and 52 and provides the support necessary to allow first and second fork arms 50 and 52 to be arranged substantially perpendicularly to the surface on which bicycle 11 is placed. In this configuration, hollow tube 16 comprises front fork 24, and downbar 14 slides into one of first fork arm 50 and second fork arm 52. This configuration thus does not require that an additional tube be attached to bicycle 11 to serve as hollow tube 16, as does the embodiment of FIGS. 3 and 4. This configuration further eliminates the weight of an additional hollow tube 16 and may reduce the overall width of bicycle 11. Not pictured is an embodiment wherein handlebar assembly 10 comprises first and second downbars adapted to slide respectively into first fork arm 50 and second fork arm 52.

Figure 6:
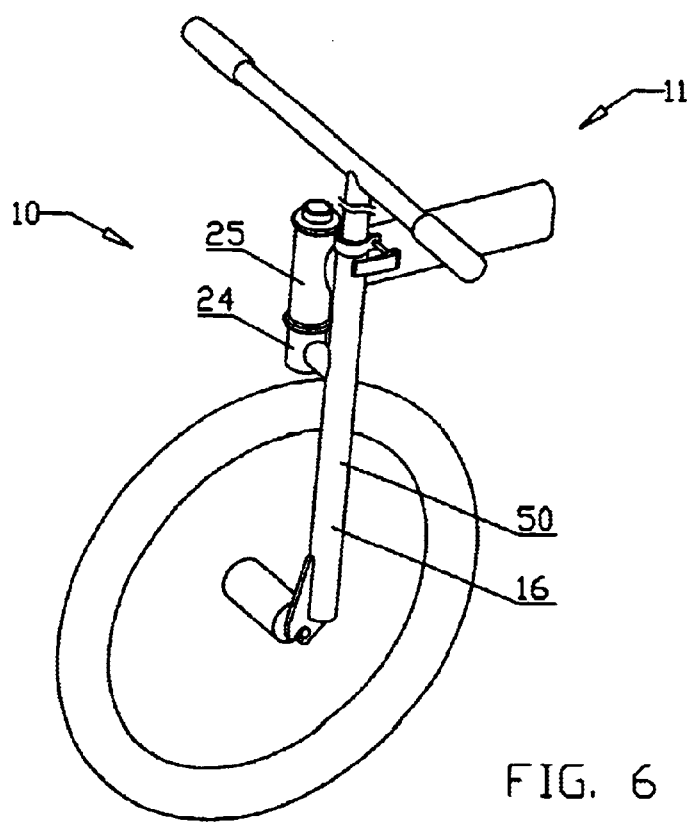
FIG. 6 is a perspective view of a handlebar assembly configured according to another embodiment of the present invention.

FIG. 6 depicts an embodiment of the present invention that may be used in conjunction with a bicycle wherein front fork 24 comprises only first fork arm 50. Continuing advances in bicycle technology have produced materials possessing the strength and weight characteristics to make possible single-arm forks as shown in FIG. 6. Handlebar assembly 10 according to the present invention functions in a single-arm fork environment just as it functions in a more conventional double-arm fork environment such as those depicted in FIGS. 3–5.

Figure 7:
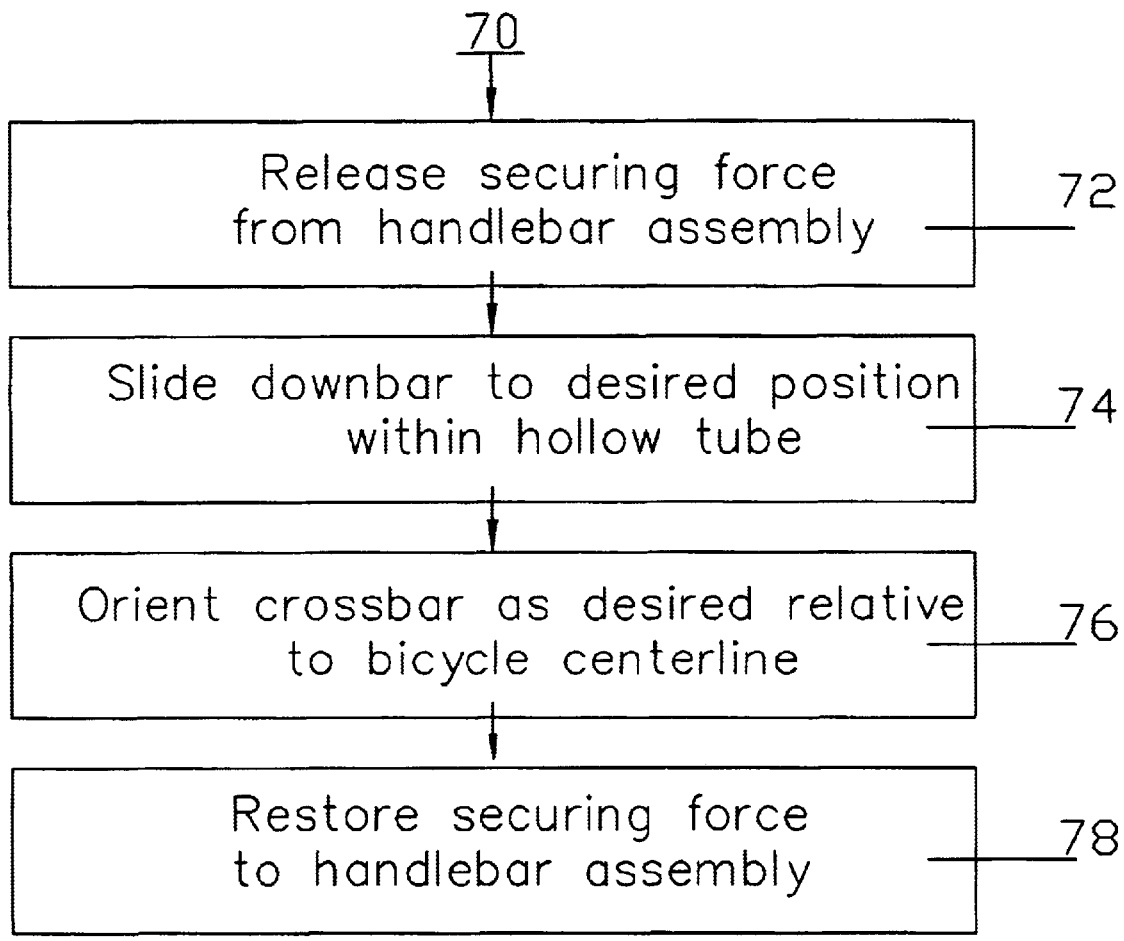
FIG. 7 is a flow diagram illustrating a method according to the present invention.

FIG. 7 is a flow diagram illustrating a method 70 according to the present invention. Method 70 describes an adjustment process of a bicycle handlebar assembly. A first step 72 of method 70 is to release a securing force from the handlebar assembly. This may be accomplished by releasing a clamp, loosening a bolt, manipulating a quick release device, or in some other fashion. A second step 74 of method 70 is to slide the downbar to a desired position within the hollow tube, whether the hollow tube be a part of the front fork or an additional tube attached to the bicycle. A third step 76 of method 70 is to orient the crossbar as desired relative to the bicycle centerline. As has been described, the crossbar may be rotated through a full circle, making this orientation process easy to perform. It may be desirable, for example, to orient the crossbar parallel to the centerline when preparing the bicycle for storage so as to minimize the bicycle's width. A fourth step 78 of method 70 is to restore the securing force to the handlebar assembly. This may be accomplished by reversing the process performed in first step 72.

The foregoing description has described selected embodiments of a telescoping bicycle handlebar assembly wherein a crossbar adapted to provide support for a rider's hands during a bicycle ride is attached to a downbar extending substantially perpendicularly therefrom. As has been described, a hollow tube adjacent to the front wheel of the bicycle and displaced from the bicycle's centerline is adapted to receive various lengths of the downbar depending on the height at which the handlebars are to be placed. A securing device is attached to the hollow tube and adapted to selectively secure the downbar in place inside the tube. The invention allows a bicycle's handlebars to be lowered quickly and easily without requiring a heavy and expensive folding mechanism that tends to introduce instability to the handlebar assembly. The present invention requires fewer joints than existing mechanisms, further increasing stability and reliability while reducing cost and weight. The invention also frees up space centered on the centerline of the bicycle that may advantageously be used for storage space that is balanced and out of the way of a rider's legs.

While the invention has been particularly shown and described with reference to selected embodiments thereof, it will be readily understood by one of ordinary skill in the art that, as limited only by the appended claims, various changes in form and details may be made therein without departing from the spirit and scope of the invention.

We claim:

1. A handlebar assembly on a bicycle wherein a front wheel of said bicycle defines a longitudinal centerline of said bicycle, said handlebar assembly comprising:

a crossbar adapted to provide support for a rider's hands during a bicycle ride;

a downbar attached at a first end to said crossbar and extending substantially perpendicularly therefrom;

a hollow tube adjacent to said front wheel and displaced from said longitudinal centerline, said hollow tube adapted to receive said downbar; and a securing device attached to said hollow tube and adapted to selectively secure said downbar in place inside said hollow tube.

2. The invention of claim 1 wherein said hollow tube comprises a front fork of said bicycle.

3. The invention of claim 1 wherein said hollow tube comprises a tube attached to a front fork of said bicycle distal to said longitudinal centerline.

4. The invention of claim 1 wherein said downbar comprises a first leg and a second leg and wherein said hollow tube further comprises a first hollow tube and a second hollow tube, said first hollow tube adapted to receive said first leg and said second hollow tube adapted to receive said second leg.

5. The invention of claim 1 wherein said securing device comprises a quick release clamp.

6. A method for adjusting a height of a handlebar assembly on a bicycle wherein a front wheel of said bicycle defines a longitudinal centerline of said bicycle, said method comprising the steps of:

releasing a securing force from said handlebar assembly;

sliding a downbar of said handlebar assembly to a desired position within a hollow tube attached to said bicycle and displaced from said longitudinal centerline;

orienting as desired a crossbar of said handlebar assembly relative to said centerline; and restoring said securing force to said handlebar assembly.

7. The method of claim 6 wherein said step of removing a securing force from said handlebar assembly is accomplished by releasing a quick release clamp attached to said hollow tube.

8. The method of claim 6 wherein said step of sliding a downbar of said handlebar assembly to a desired position comprises the step of simultaneously sliding a first leg of said downbar to a first desired position within a first hollow tube attached to said bicycle and sliding a second leg of said downbar to a second desired position within a second hollow tube attached to said bicycle.

* * * * *